(12) United States Patent
Yu (10) Patent No.: US 10,746,599 B2
(45) Date of Patent: Aug. 18, 2020

(54) SYSTEM AND METHOD FOR SPECTRAL INTERPOLATION USING MULTIPLE ILLUMINATION SOURCES

(71) Applicant: VARIABLE, INC., Chattanooga, TN (US)

(72) Inventor: George Yang Yu, Chattanooga, TN (US)

(73) Assignee: Variable, Inc., Chattanooga, TN (US)

( * ) Notice: Subject to any disclaimer, the term of this patent is extended or adjusted under 35 U.S.C. 154(b) by 64 days.

(21) Appl. No.: 16/175,369

(22) Filed: Oct. 30, 2018

(65) Prior Publication Data

US 2020/0132547 A1   Apr. 30, 2020

(51) Int. Cl.
*G01J 3/42* (2006.01)
*G01J 3/02* (2006.01)

(52) U.S. Cl.
CPC . *G01J 3/42* (2013.01); *G01J 3/02* (2013.01); *G01J 2003/425* (2013.01)

(58) Field of Classification Search
CPC ........ G01J 3/02; G01J 3/42; G01J 3/28; G01J 2003/2866; G01N 21/274
(Continued)

(56) References Cited

U.S. PATENT DOCUMENTS 5,070,732 A   12/1991 Duncan et al.
5,319,437 A   6/1994 Van Aken et al.
(Continued)

FOREIGN PATENT DOCUMENTS

CN   101055206 A   10/2007
CN   102193628 A   9/2011
(Continued)

OTHER PUBLICATIONS

Heater, Brian, Node modular iOS sensor hands-on, Oct. 20, 2012 (Oct. 20, 2012), XP002763666, Retrieved from the Internet: url:https://www.engadget.com/2012/10/20/node-modular-ios-sensor-jands-on/ [retrieved on Oct. 31, 2016].
(Continued)

*Primary Examiner* — Md M Rahman
(74) *Attorney, Agent, or Firm* — Patterson Intellectual Property Law, P.C.; Gary L. Montle (57) ABSTRACT

An optical detector is provided with multiple light sources having distinct spectral characteristics, which are controlled on/off across a range of lighting intensity combinations. A measurement sensor receives radiated light that is reflected from a target surface via confined optical channels, and generates representative output signals. A local controller or a remote computing device receives the output signals or corresponding messages from the optical detector, and generates a low resolution spectral data set based on the signals for each of the lighting intensity combinations. The low resolution spectral data set is interpolated based on machine learning algorithms trained with high resolution data from a reference device to generate a high resolution spectral data set associated with the target surface. In an embodiment, an auxiliary sensor measures light reflected from one or more light sources, wherein output signals from the measurement sensor are normalized to output values from the auxiliary sensor.

20 Claims, 10 Drawing Sheets

(58) Field of Classification Search
USPC .......................................................... 356/319
See application file for complete search history.

(56) References Cited

U.S. PATENT DOCUMENTS

| | | | |
|---|---|---|---|
| 5,959,529 | A | 9/1999 | Kail, IV |
| 6,014,221 | A | 1/2000 | Plude, Jr. |
| 6,205,244 | B1 | 3/2001 | Bawolek et al. |
| 6,396,416 | B1 | 5/2002 | Kuusela et al. |
| 6,480,299 | B1 | 11/2002 | Drakopoulos et al. |
| 6,553,336 | B1 | 4/2003 | Johnson et al. |
| 6,584,435 | B2 | 6/2003 | Mestha et al. |
| 6,720,887 | B1 | 4/2004 | Zunti |
| 6,798,517 | B2 | 9/2004 | Wagner et al. |
| 6,839,088 | B2 | 1/2005 | Dicarlo et al. |
| 6,978,217 | B2 | 12/2005 | Morozumi et al. |
| 7,283,238 | B2 | 10/2007 | Simons et al. |
| 7,502,033 | B1 | 3/2009 | Axelrod |
| 7,557,925 | B2 | 7/2009 | Nisper et al. |
| 7,572,028 | B2 | 8/2009 | Mueller et al. |
| 7,822,270 | B2 | 10/2010 | Van Hoof et al. |
| 7,876,356 | B2 | 1/2011 | Xu et al. |
| 7,944,561 | B2 | 5/2011 | Nisper et al. |
| 3,008,613 | A1 | 8/2011 | Tam |
| 8,139,220 | B2 | 3/2012 | Peterson et al. |
| 8,237,138 | B2 | 8/2012 | Nisper et al. |
| 8,271,021 | B2 | 9/2012 | Jeong |
| 8,287,279 | B2 | 10/2012 | Park et al. |
| 8,300,234 | B2 | 10/2012 | Debevec et al. |
| 8,345,252 | B2 | 1/2013 | Nisper et al. |
| 8,415,900 | B2 | 4/2013 | Covaro et al. |
| 8,441,641 | B1 | 5/2013 | Steenhoek et al. |
| 8,441,642 | B2 | 5/2013 | Wegmuller et al. |
| 8,502,980 | B2 | 8/2013 | Imura |
| 8,788,365 | B2 | 7/2014 | Paul et al. |
| 9,417,185 | B1 | 8/2016 | Bruce et al. |
| 9,562,857 | B2 | 2/2017 | Debevec et al. |
| 9,674,323 | B1* | 6/2017 | Yu .................... H04M 1/0274 |
| 10,057,549 | B2* | 8/2018 | Yu .......................... G01J 3/513 |
| 10,197,224 | B1* | 2/2019 | Macias .................... F21V 7/005 |
| 2002/0159066 | A1 | 10/2002 | Berstis |
| 2002/0184168 | A1 | 12/2002 | McClanahan et al. |
| 2003/0058202 | A1 | 3/2003 | Evanicky et al. |
| 2003/0156283 | A1 | 8/2003 | Jung et al. |
| 2004/0090536 | A1 | 5/2004 | Tsai et al. |
| 2004/0136004 | A1 | 7/2004 | Collins |
| 2004/0266480 | A1 | 12/2004 | Hjelt et al. |
| 2005/0001986 | A1 | 1/2005 | Matsuda |
| 2005/0018191 | A1 | 1/2005 | Luo et al. |
| 2005/0275912 | A1 | 12/2005 | Chen et al. |
| 2006/0146324 | A1 | 7/2006 | Klein |
| 2006/0245632 | A1 | 11/2006 | Nisper et al. |
| 2007/0035554 | A1 | 2/2007 | McClanahan |
| 2007/0045524 | A1 | 3/2007 | Rains, Jr. et al. |
| 2007/0046941 | A1 | 3/2007 | Mestha et al. |
| 2007/0222974 | A1* | 9/2007 | Zhao ................. G01N 21/8901 356/237.1 |
| 2007/0223058 | A1 | 9/2007 | Cotte et al. |
| 2007/0242064 | A1 | 10/2007 | Kuo |
| 2008/0013077 | A1 | 1/2008 | Orelli et al. |
| 2008/0062192 | A1 | 3/2008 | Voliter et al. |
| 2008/0259336 | A1 | 10/2008 | Konno et al. |
| 2009/0058663 | A1 | 3/2009 | Joshi et al. |
| 2009/0083459 | A1 | 3/2009 | Harish |
| 2009/0103075 | A1 | 4/2009 | Yang et al. |
| 2010/0085434 | A1 | 4/2010 | Stewart |
| 2010/0127282 | A1 | 5/2010 | Harbers et al. |
| 2010/0128052 | A1 | 5/2010 | Keh |
| 2010/0148083 | A1 | 6/2010 | Brown et al. |
| 2010/0271505 | A1 | 10/2010 | Zimmer et al. |
| 2010/0295942 | A1 | 11/2010 | Jekel |
| 2011/0050892 | A1 | 3/2011 | Zind et al. |
| 2011/0075146 | A1 | 3/2011 | Moroney et al. |
| 2011/0176029 | A1 | 7/2011 | Boydston et al. |
| 2011/0187632 | A1 | 8/2011 | Huang et al. |
| 2011/0201382 | A1 | 8/2011 | Hsiao |
| 2011/0215997 | A1 | 9/2011 | Kim |
| 2012/0032600 | A1 | 2/2012 | Edwards et al. |
| 2012/0096380 | A1 | 4/2012 | Wagner |
| 2012/0129269 | A1 | 5/2012 | Choi et al. |
| 2012/0170844 | A1 | 7/2012 | Suzuki |
| 2012/0250020 | A1 | 10/2012 | Hastings et al. |
| 2012/0290268 | A1 | 11/2012 | Bey et al. |
| 2012/0321177 | A1 | 12/2012 | Suzuki et al. |
| 2013/0038470 | A1* | 2/2013 | Niemeyer ............... H04Q 9/00 340/870.11 |
| 2013/0042295 | A1 | 2/2013 | Kelly et al. |
| 2013/0050703 | A1 | 2/2013 | Shannon et al. |
| 2013/0113904 | A1 | 5/2013 | Wang |
| 2013/0207994 | A1 | 8/2013 | Rodeski et al. |
| 2013/0307419 | A1 | 11/2013 | Simonian et al. |
| 2014/0071177 | A1 | 3/2014 | Chu et al. |
| 2014/0111807 | A1 | 4/2014 | Yin et al. |
| 2015/0160128 | A1 | 6/2015 | Liu et al. |
| 2015/0253428 | A1* | 9/2015 | Holz ..................... G01S 17/36 356/5.01 |
| 2015/0296189 | A1* | 10/2015 | Yu ........................... H04N 9/07 348/266 |
| 2016/0267339 | A1* | 9/2016 | Nakano ................. G06T 11/60 |
| 2016/0277660 | A1* | 9/2016 | Kaiser ................. H04N 5/2252 |
| 2017/0131147 | A1* | 5/2017 | Yu ........................... G01J 3/462 |
| 2018/0128680 | A1 | 5/2018 | Kim |
| 2018/0317306 | A1* | 11/2018 | Harris ................... H05B 45/10 |
| 2019/0096032 | A1* | 3/2019 | Li ......................... G06T 3/4007 |

FOREIGN PATENT DOCUMENTS

| | | |
|---|---|---|
| EP | 525964 A2 | 2/1993 |
| JP | 2012065192 A | 3/2012 |
| KR | 20070111671 A | 11/2007 |
| WO | 2014071302 A1 | 5/2014 |
| WO | 2017066825 A1 | 4/2017 |

OTHER PUBLICATIONS

EMX Industries, Inc., Industrial SEnsors for IndustrialAutomation and Process Control, Jul. 27, 2015, Retrieved from the internet: url:http://www.emxinc.com/industrial.html[Jul. 27, 2015 2:55:00 PM].

Hitech, NXT Color Sensor V2 (NCO1038), Jul. 27, 2015, Retrieved from the internet: url:http://www.hitechnic.com/cgi-bin/commerce.cgi?preadd=action&ke-NCO1038[Jul. 27, 2015 3:33:04 PM].

Datacolor, Spyder4Elite, Jul. 27, 2015, Retrieved from the internet: url:https://web.archieve.org/web/20120407193539/ttp://spyder.datacolor.com/portfolio-view/spyer4elite[Jul. 27, 2015 3:24:53 PM].

European Patent Office: Supplementary European Search Report in Application No. EP 13 85 00653, dated Oct. 31, 2016, 11 pp.

State Intellectual Property Office, P.R. China, First Office Action, dated May 3, 2016 in re: Patent Applicaton No. 201380062943.0, filed Nov. 4, 2013.

European Search Report for EP 15 89 1344, dated Aug. 17, 2018, 10 pp.

International Search Report and the Written Opinion of corresponding PCT/US2019/058830 dated Feb. 21, 2020, 12 pages.

* cited by examiner

SYSTEM AND METHOD FOR SPECTRAL INTERPOLATION USING MULTIPLE ILLUMINATION SOURCES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present disclosure relates generally to spectral measurement systems and methods. More particularly, the present disclosure relates to a method for enhancing the spectral resolution of a given measurement system such as for example a color measurement system, by using different combinations of illumination sources.

Spectral measurement, for example color measurement, is important for many industries including household consumer products, automobiles, and any number of other examples requiring portability, accuracy and cost-effective solutions. The color in particular of a target object may be characterized by a "spectral reflectance" which can be determined directly via the observed distribution of the proportions of different wavelengths over the extent of the visible range in a continuous spectrum. Unfortunately, many conventional high-resolution spectral measuring devices include or implement complex optical systems that make the product too bulky and expensive for many applications.

Relatively inexpensive and portable spectral measurement devices may be available, but the lower resolution of the associated optical sensors makes these options undesirable at least due to the inaccuracy of spectral data obtained therefrom. When comparing the difference in the way these types of sensors measure color (or comparing the difference in two colors in general), a color difference standard known as $\Delta E$ is most typically used. This is a special form of color space "distance" which has been developed to mimic the way the human eye perceives color difference. The process for converting from sense values and minimizing the $\Delta E$ between sensor readings and a standard color value is where instrument calibration and setup becomes important, and heavily impacts the accuracy of a color measurement tool.

One known problem with tristimulus sensor based colorimeters is that they lack the specificity of a spectrophotometer due to much fewer independent measurable parameters in the optical spectrum (i.e., an RGB colorimeter might only measure R, G, and B, whereas a spectrophotometer can record high resolution reflectance curves over the visible spectrum). Inherent design differences such as optics, stimulation sources, and detector responses make colorimeters produce a different result from a spectrophotometer and from other colorimeters.

Because of the aforementioned specificity (and greater perceived accuracy), spectrophotometer measurements are often used as reference standard. Interestingly, there does exist variation between any two spectrophotometers, and it is a common practice to calibrate a spectrophotometer to match the readings of a given reference spectrophotometer. The calibrated accuracy of this device will then be based on its conformance to the reference device.

More generally, all color measurement devices are judged based on their conformance to some reference device. Therefore, it would be desirable to provide a system and method capable of allowing less expensive detectors with low spectral resolution to accomplish accurate measurements normally requiring expensive high spectral resolution detectors.

BRIEF SUMMARY

Optical detectors usually have a limited number of narrow bands of the spectrum that it can measure. The total number of bands across a given spectral range defines the spectral resolution of a measurement system. A novel system and method as disclosed herein enhances the spectral resolution of a given measurement system by using different combinations of illumination sources.

In an embodiment, an optical detector as disclosed herein includes a plurality of light sources having distinct spectral characteristics. In one non-limiting example, the plurality of light sources include at least a first light source with a 5600K light-emitting diode (LED), a second light source with a 2700K LED, and a third light source and a fourth source having LEDs with respective spectral characteristics between 2700K and 5600K. A measurement sensor receive lights radiated by the plurality of light sources and reflected from a target surface, and further generates output signals representative of the reflected light from the target surface. A controller controls the plurality of light sources to be turned off or on across a plurality of lighting intensity combinations. The controller, or an external computing device communicatively linked to the optical detector, generates a low resolution spectral data set based on the respective output signals from the sensor corresponding to each of the plurality of lighting intensity combinations. The low resolution spectral data set is programmatically interpolated to generate a high resolution spectral data set associated with the target surface.

In another embodiment, the controller and/or external computing device is functionally linked to a data storage device comprising stored high resolution spectral data corresponding to a reference device.

In another embodiment, the controller and/or external computing device is configured to predict a high resolution spectral data set from the reference device and corresponding to the target surface, based on the sensed low resolution spectral data set.

In another embodiment, the optical detector comprises a housing having an external perimeter and a face. The plurality of light sources reside within the housing and are offset from the face to define an interior within the perimeter of the housing, wherein the face is configured to engage a target surface about the perimeter of the housing such that ambient light is substantially restricted from entering the interior. The sensor is arranged to receive light radiated by the plurality of light sources and reflected from the target surface when the face of the optical detector engages the target surface.

In another embodiment, the plurality of light sources and the sensor are mounted on a substrate oriented in parallel with the face of the housing, and the light sources are circumferentially disposed about a sensor aperture positioned between the sensor and the face of the housing.

In another embodiment, the measurement sensor is configured to receive light projected from the plurality of light sources via respective confined optical channels and reflected from the target surface, and the optical detector further comprises an auxiliary sensor configured to measure light reflected from one or more of the plurality of light sources.

In another embodiment, the controller and/or external computing device is configured to normalize the output signals from the measurement sensor to output values from the auxiliary sensor.

Numerous other objects, features, and advantages of the present disclosure will be readily apparent to those skilled in the art upon a reading of the following disclosure when taken in conjunction with the accompanying drawings.

DETAILED DESCRIPTION

Referring generally to FIGS. 1-12, a spectral measurement system and method according to the present disclosure may now be described in greater detail. Where the various figures may describe embodiments sharing various common elements and features with other embodiments, similar elements and features are given the same reference numerals and redundant description thereof may be omitted below.

Figure 1:
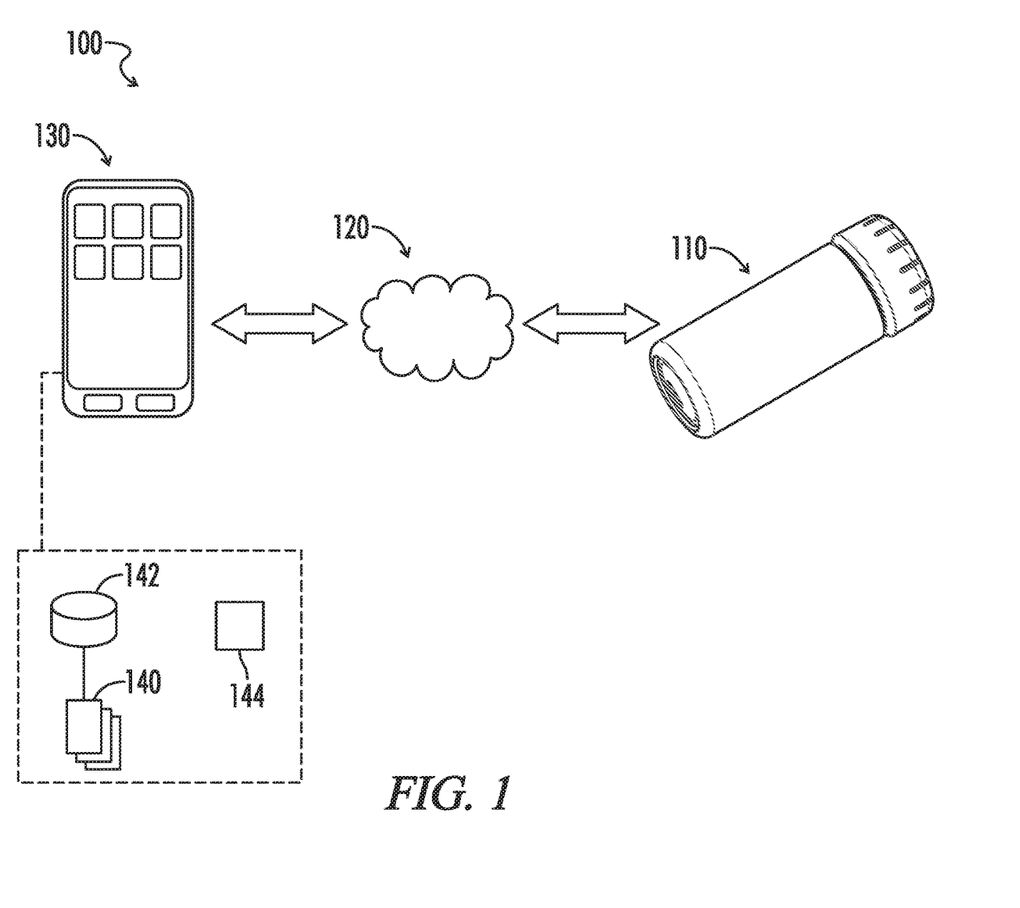
FIG. 1 is a general diagram representing an embodiment of a system as disclosed herein.

In an embodiment as represented in FIG. 1, a spectral measurement system 10 as represented may include without limitation a measurement device 110 and a computer program product 140. The program product (e.g., program instructions) may reside generally on a computer readable medium of a user computing device 130 (e.g., typically a mobile computing device such as a smartphone or tablet computer, but also including a desktop computer, etc.) external to or remote from the measurement device and executable from the mobile computing device. As further described below, program instructions may be downloadable from a host server (not shown) to the user computing device in their entirety, or in various embodiments the computer program product may be a distributed program including one or more program modules executable from the user computing device and one or more program modules executable from the host server via a communications network 120. The user computing device may comprise a processor 144 configurable to execute program modules, and may further comprise onboard data storage 142 and/or be functionally linked to remote data storage for the purposes of the presently disclosed system and method.

The term "communications network" as used herein with respect to data communication between two or more devices or otherwise between communications network interfaces associated with two or more devices may refer to any one of, or a combination of any two or more of, telecommunications networks (whether wired, wireless, cellular or the like), a global network such as the Internet, local wired or wireless networks, network links, Internet Service Providers (ISP's), and intermediate communication interfaces, modems, etc.

A computer program product 140 of a spectral measurement system 100 of the present disclosure may comprise computer instructions residing on a non-transitory computer-readable medium 142 in a computing device 130 such as for example a smart phone or tablet computer. Alternatively, the computer program product may reside in a non-transitory computer-readable medium such as a server system (not shown) remote from the computing device but communicatively linked to the computing device such that execution of the computer program product directs the performance of a sensing, storage and comparison method according to the present disclosure, at least part of which includes steps for generating a user interface on a display of the computing device and receiving user input regarding, e.g., various display parameters.

Figure 2:
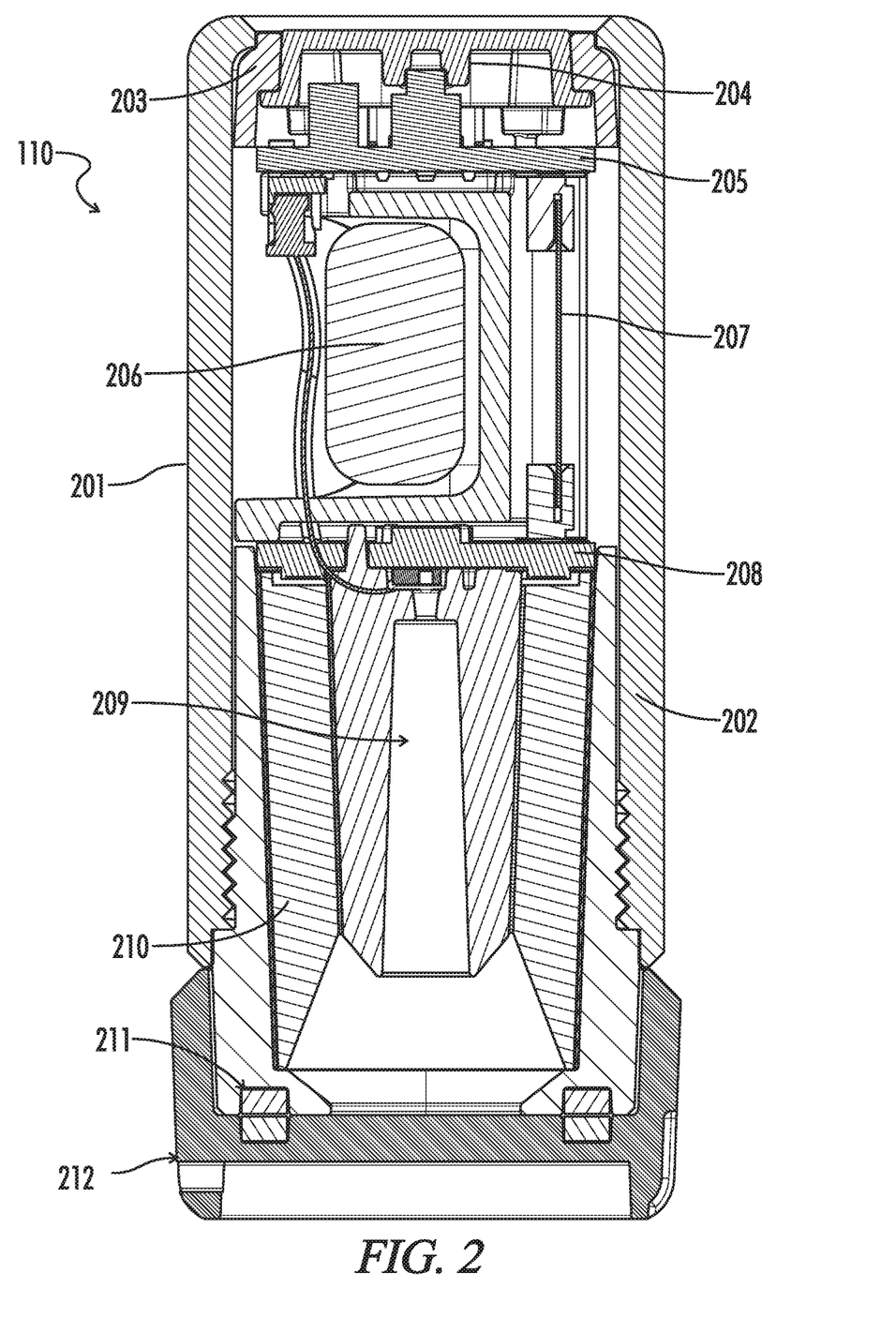
FIG. 2 is a front view of an embodiment of a spectral measurement device as disclosed herein.
Figure 3:
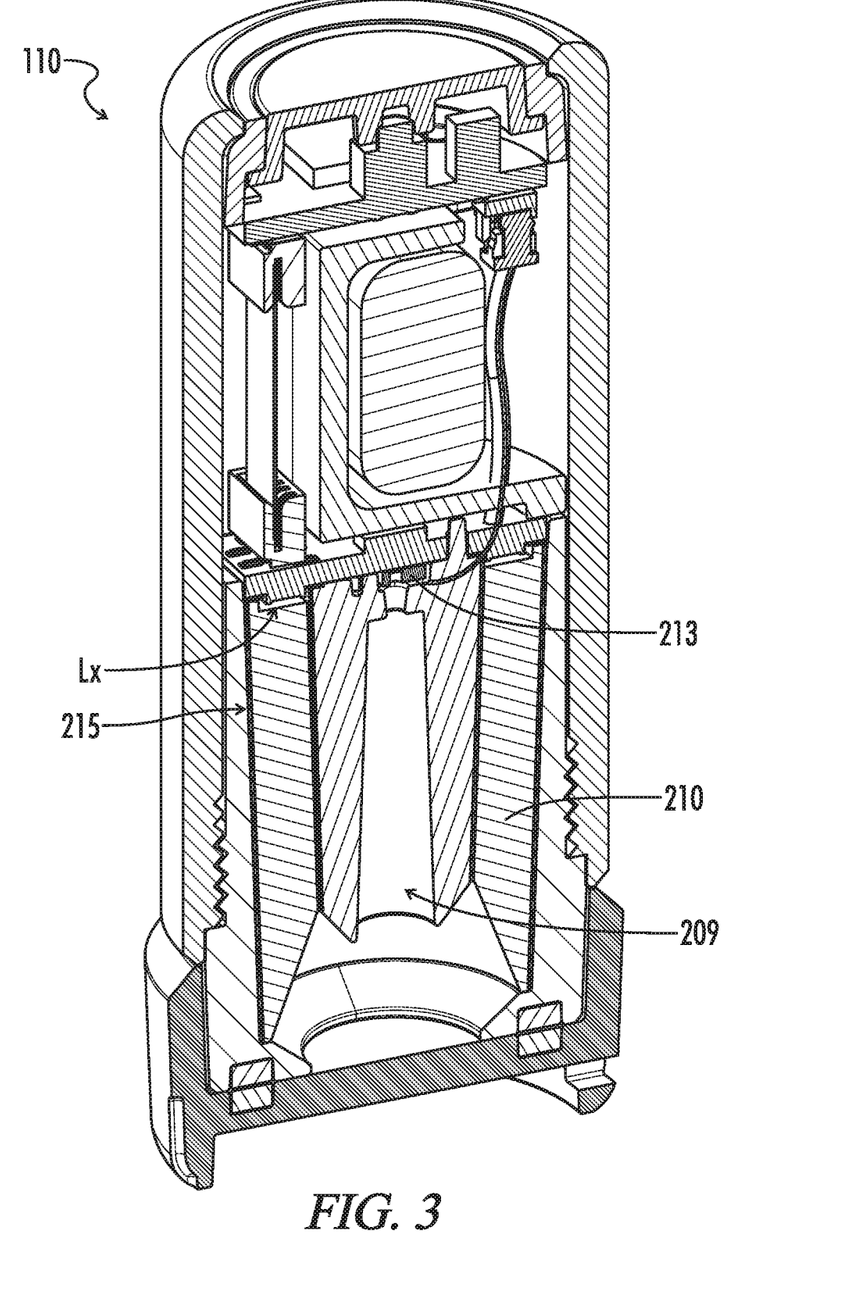
FIG. 3 is an isometric view of the device represented in FIG. 2.
Figure 4:
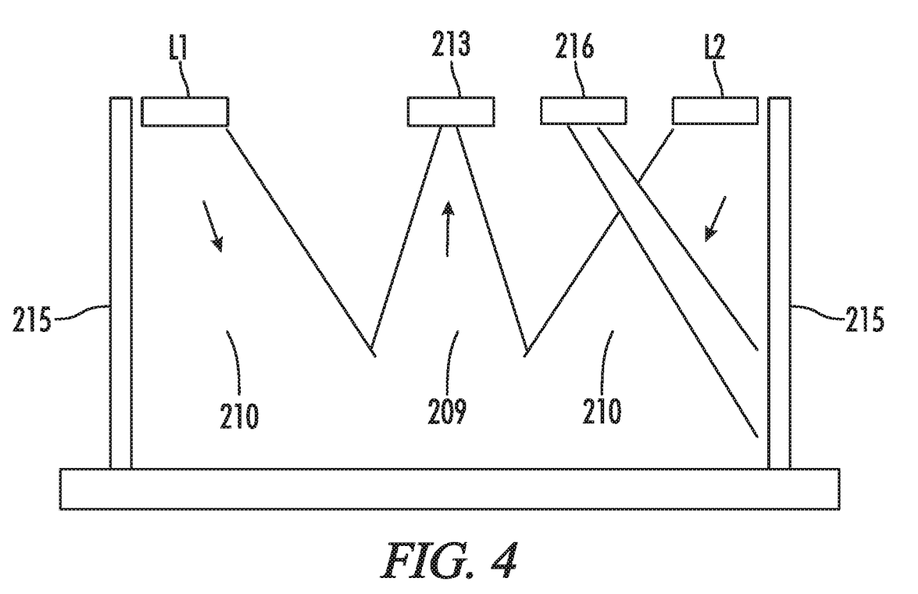
FIG. 4 is a diagram representing exemplary channels of radiated and reflected light according to the device in FIG. 2.
Figure 5:
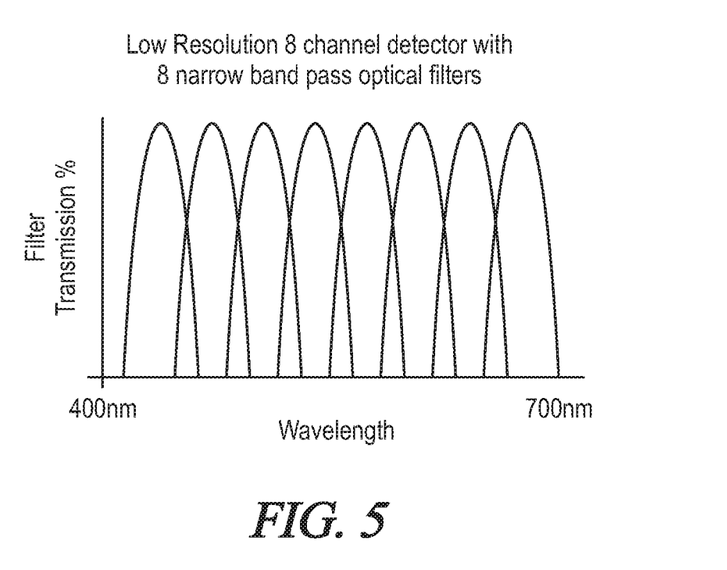
FIG. 5 is a graphical waveform diagram representing spectral detector resolution for an exemplary low resolution eight-channel detector having eight narrow band pass optical filters.
Figure 6:
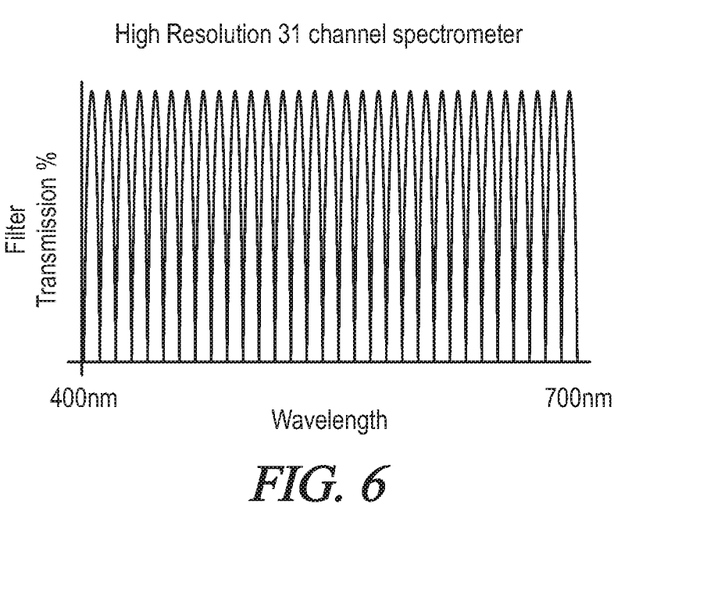
FIG. 6 is a graphical waveform diagram representing spectral detector resolution for an exemplary high resolution thirty-one channel spectrometer.

Referring next to FIGS. 2-4, an embodiment of a spectral measurement device 110 as disclosed herein includes a housing 201 with an aluminum shell 202 along the length of an exterior portion and shaped to define an interior portion.

At a first end of the device an LED indicator ring 203 is disposed about an actuator such as a button 204. The button may be configured for user interaction to, e.g., turn the device and/or associated functions on and off, wherein the LED indicator may be selectively turned on and off in accordance with the button-activated features. The LED indicator may be regulated to produce one or more colors or lighting intensities to correspond with a like number of device states, conditions, or the like.

In the interior near the first end, a controller with device logic may be mounted on a first printed circuit board (PCB) 205. A second PCB 208 is provided in the embodiment shown, separated from and disposed in parallel with the first PCB, and upon which is mounted a measurement sensor 213 and one or more lighting sources Lx such as an array of light-emitting diodes (LEDs). The second PCB may include appropriate circuitry and/or programming in conjunction with the measurement sensor effective for controlling gain, pre-scaler, and integration time, for example so as to fine-tune the sensor for a given environment. A cover made of rubber or an equivalent may be provided in some embodiments, along with an aperture of 1.00 mm to 1.59 mm configured to further allow only reflected light from a target sample to reach the measurement detector. The measurement detector is typically of relatively low resolution, as discussed in greater detail below. A power supply 206 such as a battery is provided in a cavity between the first and second PCBs, and configured to deliver requisite power to components thereon, for example via electrical leads or wires. The second PCB is also offset from a second end of the device that is defined in part by a face shaped to engage a target surface. When the face is disposed to engage the target surface, the housing may thereby be effective to restrict (ideally, to prevent) ambient light and otherwise enable only light radiated from the light source and reflected back from the target surface of interest to be received by the measurement sensor.

In the present example, a plurality of LEDs (L1, L2, Lx) are arranged circumferentially about the measurement sensor 213 to emit light through confined optical channels 210 and so as to reflect off a target surface engaged by a second end of the device. In an embodiment, a face of the second end of the device comprises a thin clear protection window effective to engage the target surface, and the confined optical channels desirably prevent stray light from contaminating light detection and associated spectral reflectance determination. White reflectors 215 may be provided along the sides of the optical channels. The reflected light is directed through a central channel 209 to the measurement sensor. In an embodiment, the defined peripheral channels may extend at an angle (e.g., 45 degrees) apart from the central channel with respect to a reference plane of the face of the second end of the device, and the central channel extends at a ninety degree angle with respect to the reference plane of the face.

In an embodiment as shown, a dust cap 212 may be provided about the second end of the device housing 201, and connected to the housing via for example corresponding magnetic elements 211.

In an embodiment, a reference detector 216 may be provided alongside the spectral measurement detector 213 on the second PCB 208. The measurement detector measures light that has been reflected from a target measurement surface. In contrast, the reference detector measures reflected light from one or more of the LEDs to account for spectral changes in the light source due to changes in the temperature. All measurement results from the measurement detector may accordingly be normalized by the controller (or by a remote processing unit that is configured to analyze the spectral measurement data from the device) to values obtained from the reference detector.

Generally stated, spectral emissivity relationships are known to characterize the reflectance of a target surface over a variety of wavelengths. Spectral resolution as referred to herein describes the ability of a measurement detector to define wavelength intervals, wherein a higher resolution measurement detector may naturally produce a narrower wavelength range for any one particular channel. Otherwise stated, a measurement detector having a particular wavelength range will have a maximum allowable number of individual wavelengths that is based on its spectral resolution, wherein the higher resolution devices allow for a larger number of individual wavelengths/channels. A measurement detector 213 used in an exemplary system as disclosed herein may be for example an eight-channel detector with eight narrow band pass optical filters, having a relatively low spectral resolution as illustrated in the filter transmission rates of FIG. 5. As previously noted, the total number of bands across a given spectral range defines the spectral resolution of a measurement system. Accordingly, this type of detector is clearly less effective than, e.g., a high resolution thirty-one channel spectrometer having a spectral solution as illustrated in the filter transmission rates of FIG. 6. A system and method as disclosed herein may enhance the otherwise limited spectral resolution of the measurement detector by using different combinations of illumination sources.

Figure 7:
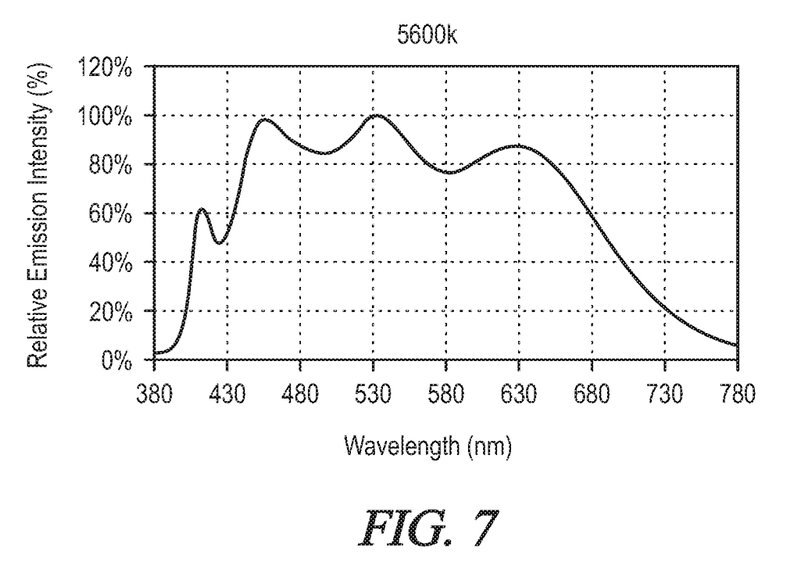
FIG. 7 is a graphical waveform diagram representing spectral distribution for an exemplary 5600K LED light source.
Figure 8:
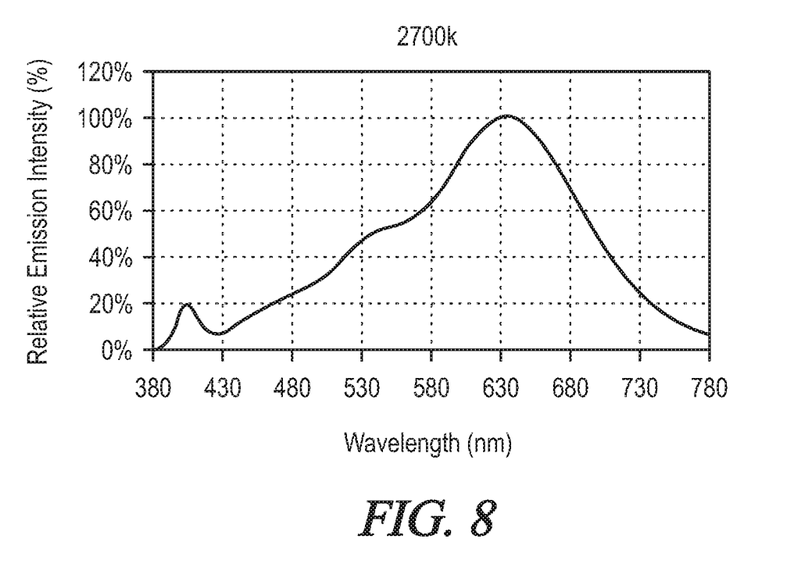
FIG. 8 is a graphical waveform diagram representing spectral distribution for an exemplary 2700K LED light source.

In a particular embodiment, the light source is comprised of a plurality of spectrally different but stable illumination sources (L1, L2, . . . Lx). For example, a first illumination source L1 may be a 5600K LED having a spectral distribution as illustrated in FIG. 7, wherein a relative emission intensity is higher at lower wavelengths and gradually falls at higher wavelengths on the spectrum. A second illumination source L2 in the array Lx may be a 2700K LED having a spectral distribution as illustrated in FIG. 8, wherein a relative emission intensity increases at progressively higher wavelengths until peaking at around 630 nm. Additional illumination sources may be provided having different spectral distributions, for example between the aforementioned 2700K and 5600K characteristics.

Upon activation of a spectral measurement sequence, the controller may deliver control signals to drive the respective LEDs (L1, L2, . . . Lx) according to various predetermined combinations of lighting intensities. As LEDs may have a lighting intensity corresponding to the current driven there through, the control signals may have the effect of regulating an output current from a DC power supply in a manner known in the art, wherein a maximum output current for example corresponds to a 100% lighting intensity and a plurality of lesser output current values may correspond to a like plurality of lighting intensities. For each combination of lighting intensities, the measurement detector 213 captures corresponding readings and causes them to be recorded.

Figure 9:
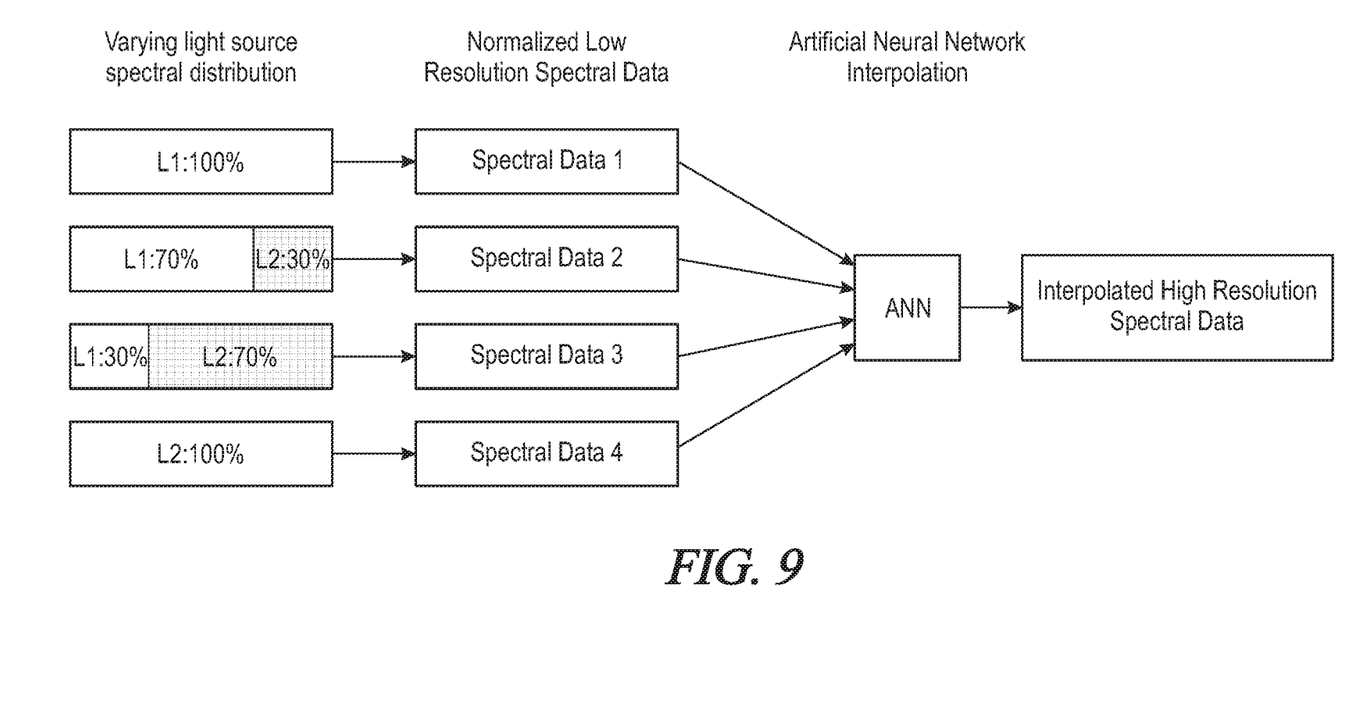
FIG. 9 is a block diagram representing an exemplary interpolation process according to an embodiment of a method as disclosed herein.

Referring next to FIG. 9, an exemplary set of combinations may include a first spectral distribution stage wherein a first light source L1 is controlled to 100% lighting intensity and a second light source L2 is controlled to 0%. In a second spectral distribution stage the first light source is controlled to 70% lighting intensity and the second light source is controlled to 30%. In a third spectral distribution stage the first light source is controlled to 30% lighting intensity and the second light source is controlled to 70%. In a fourth spectral distribution stage the first light source is controlled to 0% lighting intensity and the second light source is controlled to 100%. These stages are of course merely exemplary, as alternative combinations are within the scope of the present disclosure, as well as varying spectral distribution combinations including more than two light sources. For each different ratio of lighting intensities for the two (or more) light sources, a normalized low resolution spectral data set is generated. The various low resolution spectral data sets are then interpolated using, e.g., machine learning techniques to provide a resultant high resolution spectral data set.

In a particular embodiment involving color measurement, matching tables may be provided in association with one or more data batches. Matching tables may comprise data correspondence information, such as conversion or mapping information between color spaces or reference data. Each batch may comprise at least one color sensing device having an individual sensor calibration, and may for example be configured to group a plurality of color sensing devices according to an associated ΔE value. As previously noted, a ΔE value is a color difference standard which traditionally refers to a color space "distance" related to a perceived color difference when viewed by a human eye. Each batch may be associated with an absolute adjustment that is used to align a color sensing device to a specified reference device by establishing a relationship between the devices. This relationship may be modeled as a mathematical function where the input is an unadjusted color reading of a device to be aligned, and the output is a color reading of a reference device corresponding to data stored in matching table. This mathematical function may correspond to the following equation:

$$SCANref = f(SCANdevice)$$

Due to the potential complexity of this function, it may be difficult to find it through pure mathematical techniques. This difficulty may be overcome by restructuring the problem into a supervised learning problem, for which a function approximation algorithm may be used.

As understood in the art, supervised learning is a branch of machine learning in which a learning algorithm is presented a set of inputs and the corresponding correct outputs. The algorithm may then "learn" the relationship between these inputs and outputs and produces a model that can be used to predict future unknown data based on the data it has been trained to learn. Therefore, the strategies presented herein may, in various embodiments, involve obtaining unadjusted spectral data and reference device data for a specially formulated set of spectral data coefficients. This data may then be used to create a model for general use in transforming "raw" low resolution data sets into "adjusted" high resolution data.

Figure 10:
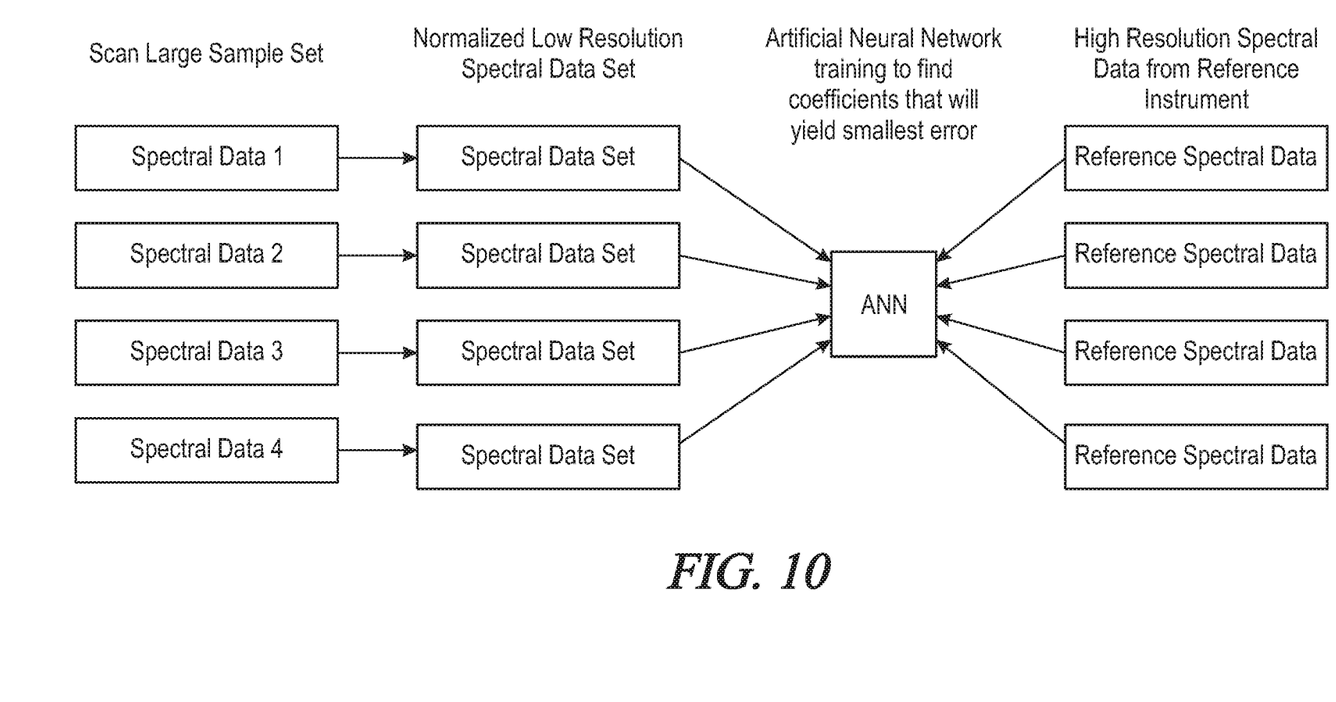
FIG. 10 is a block diagram representing an exemplary algorithm training process according to an embodiment of a method as disclosed herein.

In an embodiment, the interpolation process may be facilitated by a trained Artificial Neural Network (ANN). An ANN is a machine learning method that is capable of estimating very complex functions present in the training set. The ANN may be trained in one embodiment by using the standard gradient-descent backpropagation algorithm. As illustrated in FIG. 10, the measurement system is "trained" using a group of training samples with known spectral data as measured by a high resolution reference instrument. A large sample set is collected from a comparatively low resolution measurement device, producing scanned sets Sample 1, Sample 2, Sample 3, and Sample 4. Each set of raw data is normalized to produce a low resolution spectral data set. Machine learning algorithms may then be applied to train the ANN based on the specific training samples to predict the high resolution output from the reference device corresponding to raw data generated from the measurement system, namely, from the measurement device and/or any appropriately aligned or grouped devices. In an embodiment, the training is specifically conducted to identify coefficients that yield the smallest possible error for a given raw sample of spectral data with respect to corresponding high resolution spectral data. This ANN can now be implemented to predict high resolution spectral data from new or subsequent raw data using the measurement system as disclosed herein.

Figure 11:
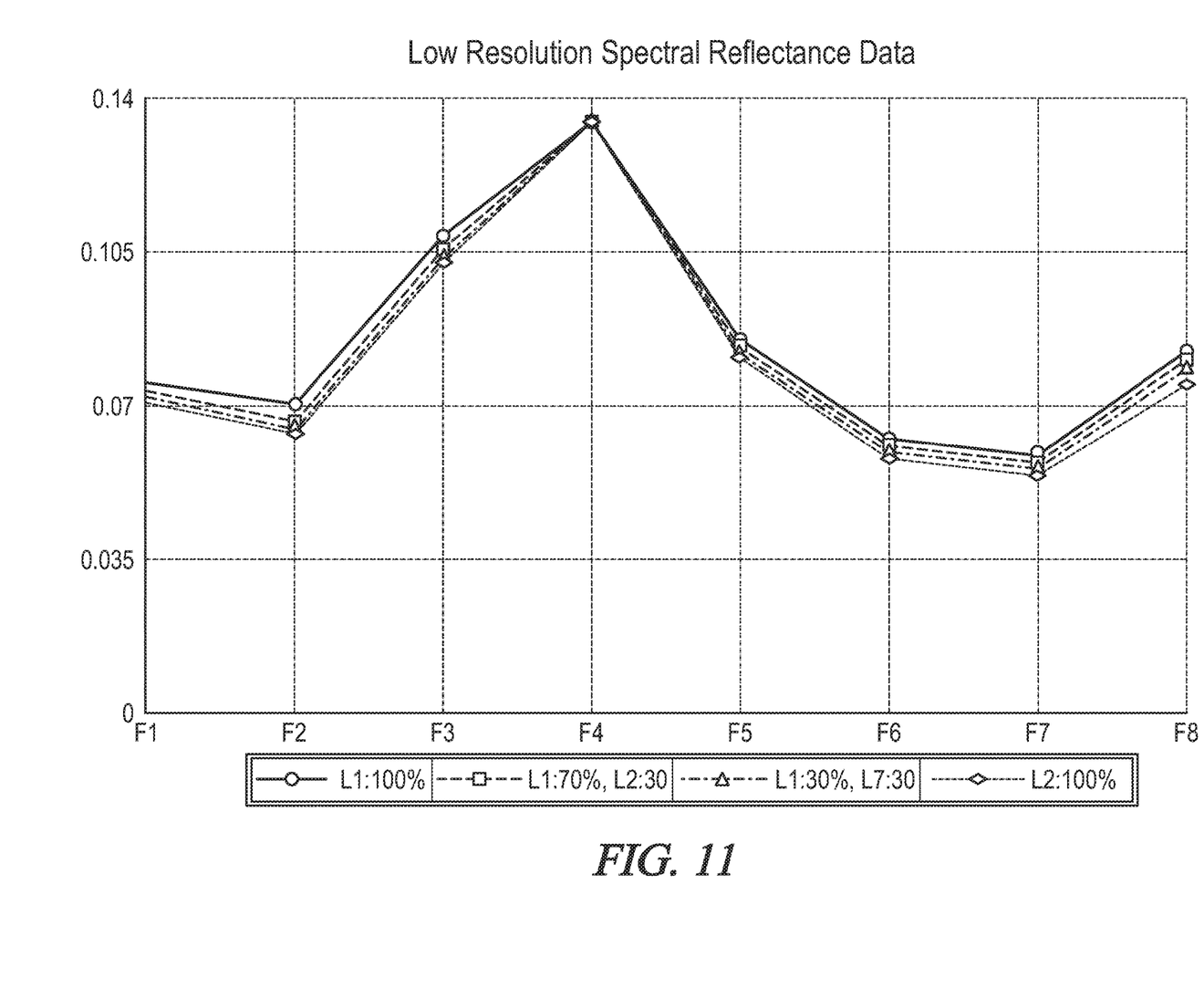
FIG. 11 is a graphical waveform diagram representing an exemplary set of low resolution spectral reflectance data.
Figure 12:
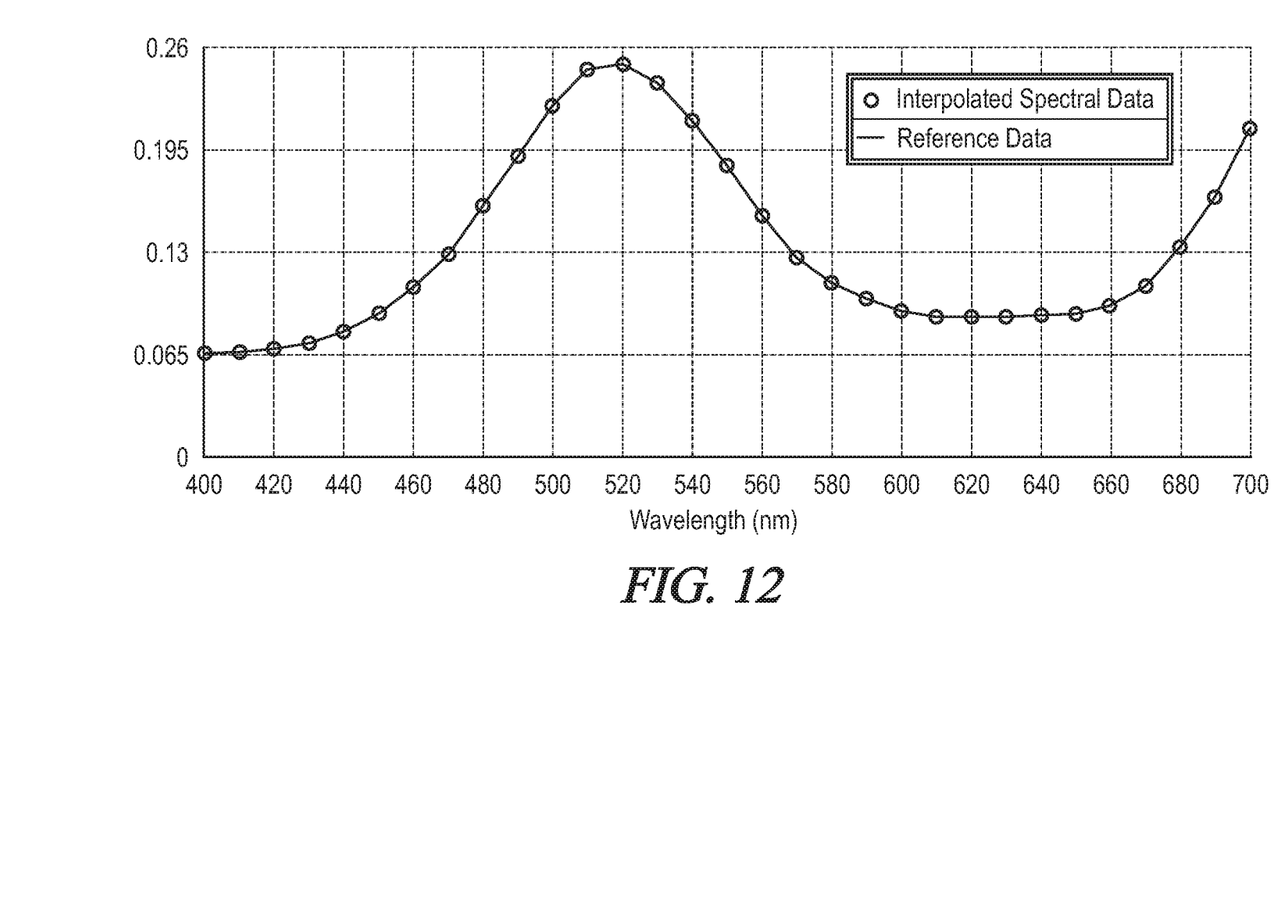
FIG. 12 is a graphical waveform diagram representing an exemplary set of interpolated spectral reflectance data with respect to reference instrument data.

Referring to FIG. 11, a first example data set represents low resolution spectral reflectance data as captured in its raw form for each of multiple lighting intensity combinations. Referring next to FIG. 12, that same spectral reflectance data is represented in interpolated form with respect to reference instrument data, wherein any one given spectral data set may reliably correspond to a predicted high resolution value. Accordingly, even relatively inexpensive detectors with low spectral resolution may be implemented to accomplish accurate measurements that normally require much more expensive high spectral resolution detectors.

In an embodiment, again with reference to the color measurement example, a supervised training set of raw scans and reference scans may be stored in a database. When an unadjusted color reading needs to be aligned, a K Nearest Neighbor (KNN) algorithm may search through the database for the K nearest scans to the unadjusted reading. The KNN algorithm may then return a weighted average of the K corresponding reference scans. The results of the KNN algorithm are extremely accurate for colors in or near a designated color set.

In an embodiment, the system may include a supplemental measurement surface adjustment. For example, the measurement device illuminates a measurement surface with a known light source and captures the portion of this light reflecting off the surface. The reflection of this light may vary based in part on surface texture and translucency of the substrate. It is very likely that a desired reference device may capture light from a rough surface texture differently from an unaligned measurement device. These effects may be minimal for subtly textured surfaces, but some materials such as brick or carpet can be so porous that they will greatly affect the response of reflected light. In order to accurately align with the reference device for a given surface texture, a supplemental adjustment may be used in series after an absolute adjustment. This allows the absolute adjustment to make modifications needed to align a spectral data measurement device with the desired reference device, and the supplemental adjustment to handle any sort of shift that may occur due to surface texture.

In addition to supplemental adjustments for surface textures, it is also possible in one exemplary embodiment to circumvent any true alignment, and to build a database of unadjusted measurement values for a given spectral data set. This may then be used to simply "match" unknown scans to the closest known spectral data set in the database.

An exemplary system may include reference libraries, wherein once batch-specific absolute adjustment and supplemental adjustment techniques have been applied all measurement devices may align with each other and the reference device. Accordingly, the measurement device will be able to provide a reference-aligned reading, and a single reference library will work for every batch of measurement devices. It is worth noting that, as described above, the reference device is not limited to a particular device, but rather any suitable high resolution device may be defined as the reference device in accordance with the present disclosure.

Once all the data needed to build an alignment model for a single spectral measurement device has been obtained, it must be able to be accessed by the measurement device itself. The data could be stored in direct memory on the measurement device. However, one concern would be whether new alignment methods could be created which cause the measurement device to become obsolete. It would be extremely inefficient to update individual devices to work with the new alignment methods.

As mentioned above, one solution to this is to implement an embodiment which is configured to store, maintain, and update this data in a cloud database that can be accessed by a measurement device, for example via an internet-connected client device. A database according to this exemplary embodiment may be utilized in two main ways, each naturally requiring some level of internet connectivity to access the cloud database. Currently, Bluetooth radio technology may permit devices to interface with one or more internet connected client devices which may be configured to act as a cloud client. Alternatively, a measurement device may comprise onboard internet connectivity which permits the measurement device to act as its own cloud client. Alternatively, or in conjunction with these exemplary embodiments, a measurement device may comprise onboard internet connectivity permitting the measurement device to connect to an external device which functions as a cloud client or a cloud service.

A cloud client may interact with a cloud service in a plurality of manners. In one embodiment, the cloud client may connect to a cloud service. The measurement device may be connected to an internet enabled device that will act as the cloud client. The measurement device may relay its unique ID to the cloud service via the cloud client. The cloud service may respond with alignment data that is unique to the measurement device. This information may be stored at the internet enabled device, where a software application may perform processing to utilize the alignment data and process referenced aligned spectral data measurements. Alternatively, the information may be transmitted to the measurement device, which may perform processing to utilize the alignment data and referenced aligned spectral data measurements.

In one embodiment, the aforementioned software application that interacts with the cloud service and stores data on the client internet enabled device may be packaged as a software Application Programming Interface (API), and may be made available for use by applications and software developers. If new alignment methods are developed or more reference libraries are added to the cloud database, the cloud service may permit seamless updates of the information stored in the client application, and the API may automatically detect and/or request updates upon internet connectivity or when internet connectivity is present. This allows the device to become "smarter" over its lifetime without the need for recalls or cumbersome device firmware updates.

In another embodiment, all or a portion of alignment operations may be performed by cloud service. Rather than relying on a cloud client to perform alignment calculations, it can simply relay raw sensor readings and a unique device ID to the cloud service and allow any or all of the adjustments to be performed remotely in the cloud. Though this requires internet connectivity to receive adjusted scans, this embodiment may be desirable for a number of reasons (e.g., connectivity, distributability, etc.).

In one embodiment, various functionality of their measurement devices may be restricted (e.g., for security purposes). In one setting, many raw sensor readings may be recorded at a single time, then a request that they be adjusted by many alignment methods at once may be received, the alignment methods may be performed in accordance with any future alignment methods. Allowing all calculations to be performed in by the cloud service may require internet connectivity, but also adds many freedoms from the perspective of an end user.

A cloud-based method as disclosed herein may include providing a sensor ID to client device(s) for example by a spectral data measurement device. As described above, a client device may comprise an internet connected device, a measurement device, or the like, or may be a separate device in communication with a measurement device. A client device may request calibration data, for example from a cloud service. Response data and/or matching data may be returned to the client device. A client device may perform adjustment operations corresponding to the response data and/or matching data.

Alternatively, the alignment may be substantially performed by a cloud service. A measurement device sends a raw sensor reading and a sensor ID to a client device, which sends the raw sensor data and the sensor ID along with an adjustment type to the cloud service. The cloud service may then perform operations corresponding to raw sensor reading, sensor ID, and/or adjustment type. Aligned spectral data and/or match data may be returned to a client device.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm) Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. In various embodiments, software may be executed by a processor to cause the processor to perform operations. These operations may correspond to algorithms and/or flowcharts illustrated in the figures and described herein.

Various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described various exemplary embodiments set forth herein, it is not intended that such references be construed as limitations upon the scope of this invention except as set forth in the following claims.

What is claimed is:

1. A system comprising:
    an optical detector further comprising
        a plurality of light sources having distinct spectral characteristics,
        a sensor arranged to receive light radiated by the plurality of light sources and reflected from a target surface, the sensor further effective to generate output signals representative of the reflected light from the target surface;
    a controller configured to
        control the plurality of light sources to be turned off or on across a predetermined plurality of lighting intensity combinations,
        generate a low resolution spectral data set based on the respective output signals from the sensor corresponding to each of the predetermined plurality of lighting intensity combinations, and
        programmatically interpolate the low resolution spectral data set to generate a high resolution spectral data set associated with the target surface.

2. The system of claim 1, further comprising the controller functionally linked to a data storage device comprising stored high resolution spectral data corresponding to a reference device.

3. The system of claim 2, wherein the controller is configured to predict a high resolution spectral data set from the reference device and corresponding to the target surface, based on the sensed low resolution spectral data set.

4. The system of claim 1, wherein the plurality of light sources comprises at least a first light source with a 6500K light-emitting diode (LED) and a second light source with a 2700K LED.

5. The system of claim 4, wherein the plurality of light sources comprises a third light source and a fourth source having LEDs with respective spectral characteristics between 2700K and 6500K.

6. The system of claim 1, wherein the optical detector comprises:
    a housing having an external perimeter and a face,
    the plurality of light sources residing within the housing and offset from the face to define an interior within the perimeter of the housing, the face configured to engage a target surface about the perimeter of the housing wherein ambient light is substantially restricted from entering the interior, and
    the sensor is arranged to receive light radiated by the plurality of light sources and reflected from the target surface when the face of the optical detector engages the target surface.

7. The system of claim 6, wherein the plurality of light sources and the sensor are mounted on a substrate oriented in parallel with the face of the housing, and the light sources are circumferentially disposed about a sensor aperture positioned between the sensor and the face of the housing.

8. The system of claim 7, wherein the controller resides within the housing of the optical detector.

9. The system of claim 7, wherein the optical detector is configured to transmit the output signals to a remote computing device comprising the controller.

10. The system of claim 7, wherein the sensor is a first measurement sensor configured to receive light projected from the plurality of light sources via respective confined optical channels and reflected from the target surface, and the optical detector further comprises an auxiliary sensor configured to measure light reflected from one or more of the plurality of light sources.

11. The system of claim 10, wherein the controller is configured to normalize the output signals from the first measurement sensor to output values from the auxiliary sensor.

12. A method of generating high resolution spectral data for a target surface based on low resolution spectral data from an optical detector comprising a plurality of light sources having distinct spectral characteristics, and a sensor arranged to receive light radiated by the plurality of light sources and reflected from the target surface, the method comprising:
    controlling the plurality of light sources to be turned on or off across a predetermined plurality of lighting intensity combinations;
    receiving output signals from the sensor as representative of the reflected light from the target surface;
    generating a first spectral data set based on the respective output signals from the sensor and corresponding to each of the predetermined plurality of lighting intensity combinations; and
    programmatically interpolating the first spectral data set with respect to a stored second spectral data set associated with a reference device.

13. The method of claim 12, comprising predicting a second spectral data set from the reference device as corresponding to the target surface, based on the sensed first spectral data set.

14. The method of claim 12, further comprising measuring light reflected from one or more of the plurality of light sources via an auxiliary sensor.

15. The method of claim 14, further comprising normalizing the output signals with respect to output values from the auxiliary sensor.

16. A system comprising:
    an optical detector further comprising
        a plurality of light sources having distinct spectral characteristics,
        a sensor arranged to receive light radiated by the plurality of light sources and reflected from a target surface, the sensor further effective to generate output signals representative of the reflected light from the target surface;

a controller configured to control the plurality of light sources to be turned off or on across a predetermined plurality of lighting intensity combinations; and a computing device communicatively linked to receive messages corresponding to the output signals from the optical detector, the computing device configured to generate a first spectral data set based on messages from the optical detector corresponding to the predetermined plurality of lighting intensity combinations, and programmatically interpolate the first resolution spectral data set to generate a second spectral data set associated with the target surface.

17. The system of claim 16, further comprising a data storage device comprising stored high resolution spectral data corresponding to a reference device, wherein the computing device is configured to predict a second spectral data set from the reference device and corresponding to the target surface, based on the sensed first spectral data set and the stored high resolution spectral data.

18. The system of claim 16, wherein the optical detector comprises:

a housing having an external perimeter and a face, the plurality of light sources residing within the housing and offset from the face to define an interior within the perimeter of the housing, the face configured to engage a target surface about the perimeter of the housing wherein ambient light is substantially restricted from entering the interior, and the sensor is arranged to receive light radiated by the plurality of light sources and reflected from the target surface when the face of the optical detector engages the target surface, wherein the plurality of light sources and the sensor are mounted on a substrate oriented in parallel with the face of the housing, and the light sources are circumferentially disposed about a sensor aperture positioned between the sensor and the face of the housing.

19. The system of claim 18, wherein the sensor is a first measurement sensor configured to receive light projected from the plurality of light sources via respective confined optical channels and reflected from the target surface, and the optical detector further comprises an auxiliary sensor configured to measure light reflected from one or more of the plurality of light sources.

20. The system of claim 19, wherein the computing device is configured to normalize the output signals from the first measurement sensor to output values from the auxiliary sensor.

* * * * *